United States Patent [19]

Sandrock et al.

[11] 4,037,682
[45] July 26, 1977

[54] ENGINE COMPARTMENT ENCLOSURE

[75] Inventors: Don G. Sandrock, McHenry; Peter J. Hoag, Arlington Heights, both of Ill.

[73] Assignee: Fiat-Allis Construction Machinery, Inc., Deerfield, Ill.

[21] Appl. No.: 659,678

[22] Filed: Feb. 20, 1976

[51] Int. Cl.² .......................................... B62D 25/10
[52] U.S. Cl. .................................. 180/69 R; 49/371; 180/54 A; 181/33 K
[58] Field of Search ............... 180/69 R, 69 C, 54 A; 49/371, 104; 220/256, 259; 181/33 K

[56] References Cited

U.S. PATENT DOCUMENTS

| 1,859,331 | 5/1932 | Heaslet | 180/69 R |
| 1,933,894 | 11/1933 | Clink | 220/259 |
| 3,270,462 | 9/1966 | Obadal et al. | 180/69 R |
| 3,762,489 | 10/1973 | Proksch et al. | 180/69 R |
| 3,815,965 | 6/1974 | Ostwald | 181/33 K |
| 3,865,210 | 2/1975 | Vonfummetti et al. | 180/69 R |
| 3,960,238 | 6/1976 | McClure et al. | 181/33 K |
| 3,970,161 | 7/1976 | Rowe et al. | 180/54 A |

Primary Examiner—Robert R. Song
Assistant Examiner—David M. Mitchell
Attorney, Agent, or Firm—Robert A. Brown; August E. Roehrig, Jr.; Harvey W. Rockwell

[57] ABSTRACT

An engine compartment enclosure for reducing sound emission from the engine while providing adequate air flow through the engine compartment for cooling and accessibility to the interior thereof for servicing. An upwardly swingable hood panel, a downwardly swingable service panel and an outwardly swingable sound barrier panel are operatively connected such that the sound barrier panel, when closed, secures both the hood and service panels in their closed position allowing a single latch to function as a security lock for controlling access to the engine compartment. Upon unlatching and swinging the sound barrier panel outwardly, the hood panel may be raised and the service panel lowered providing complete access to the interior of the engine compartment.

10 Claims, 4 Drawing Figures

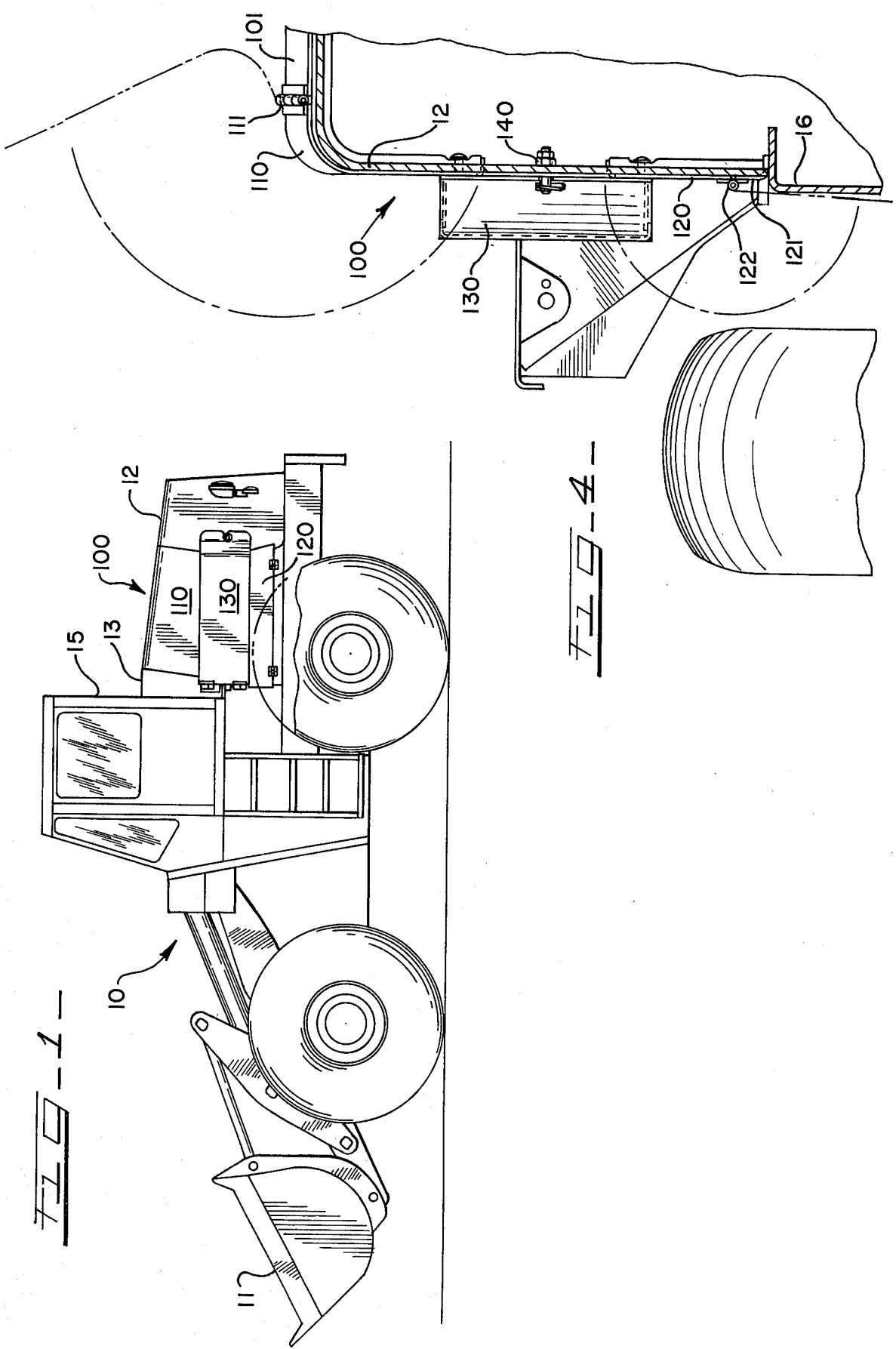

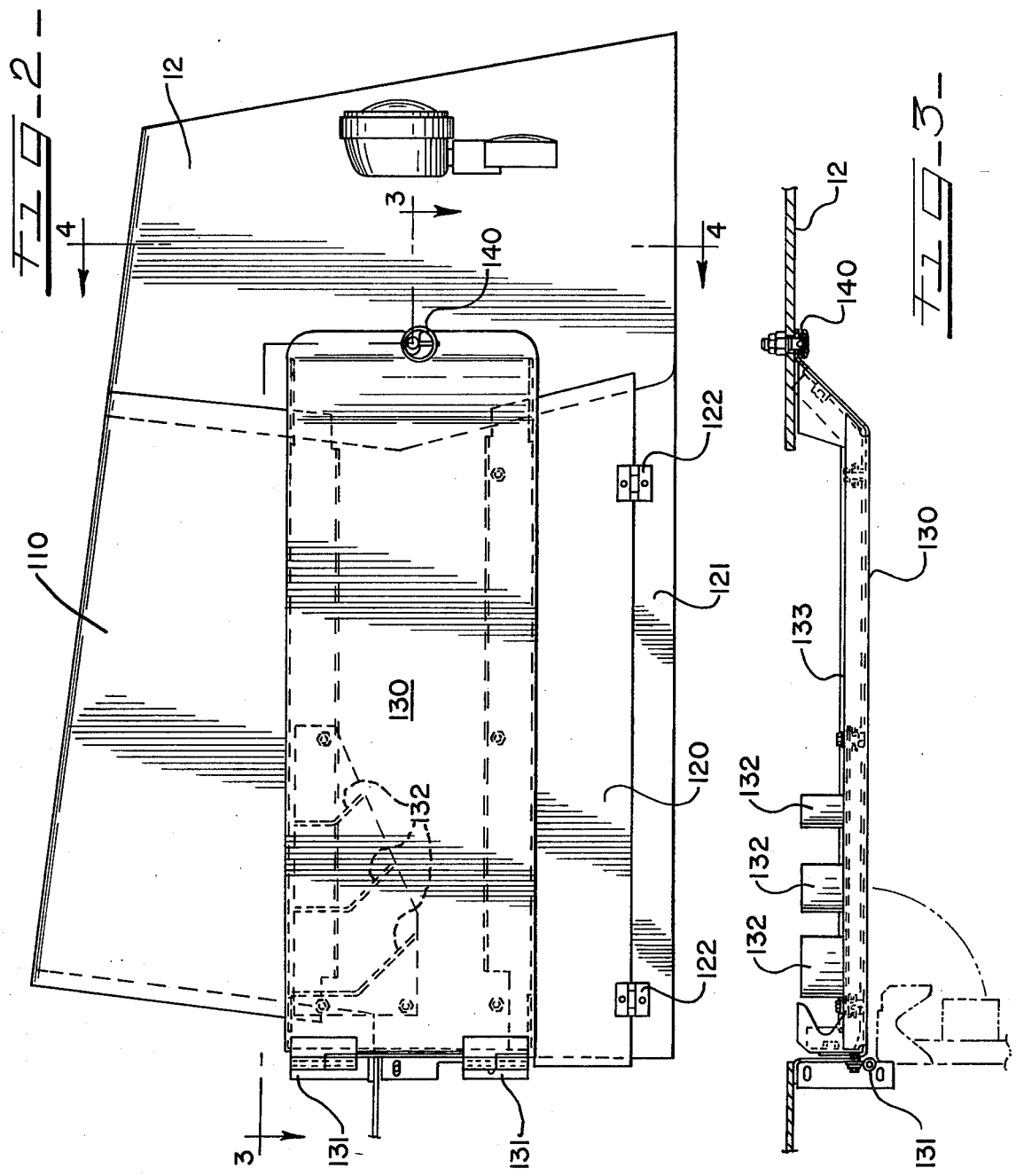

ENGINE COMPARTMENT ENCLOSURE

BACKGROUND OF THE INVENTION

This invention relates in general to enclosures and, in particular, to an enclosure for an engine compartment.

More specifically this invention relates to an engine compartment which reduces the noise level of the engine during operation while providing adequate air flow for engine cooling and accessibility to the interior of the engine compartmentfor servicing. While this invention has general application as a sound reducing enclosure with panels readily movable into a position giving complete access to the interior of the enclosure, for convenience of illustration the preferred embodiment will be described with reference to enclosing the engine compartment of an earthmoving vehicle, although it is not intended to be limited thereto.

In the operation of a large horsepower engine, such as used in the earthmoving vehicles or construction machinery, the noise emitted from the engine is loud and may be irritating to the machine operator as well as persons in close proximity to the machine. Due to the harmful effects of excessive noise, legislation has been enacted requiring that operational noise levels not exceed predetermined limits.

One attempt to provide a solution to this excessive noise problem has been to have the machine operators wear noise suppressing equipment such as ear plugs or headsets which suppress the noise surrounding them. Another problem has been to enclose the machine cab with sound retardant or suppressing material. While such solutions have reduced the noise level for the machine operator, even at the inconvenience associated with wearing such equipment, these solutions to this problem have not been entirely satisfactory. Isolating the machine operator from the noise does not eliminate the irritation or harmful effect of the noise on others around the machine. In addition, such solutions create a potential safety hazard since the machine operator is acoustically isolated from all sounds including instructions and hazard warnings, as well as the objectional machine noise.

Therefore, in order to reduce the noise level of the machines without creating additional safety problems, various muffling or noise-suppressing devices have been developed for use on the operating engines. These devices, such as mufflers, suppress the noise by reducing the noise level of the cylinder discharge. However, as is well known, such noise suppression devices create back pressure on the engine and, thereby, reduce engine efficiency.

The present invention is an enclosure for an engine which suppresses operational sounds. The enclosure provides adequate air flow to the engine for cooling as well as complete access to the engine compartment for servicing, an important requirement for field operation. The panels which comprise the engine compartment enclosure are operatively connected in a manner such that a single latch may be utilized to lock the panels in their closed position for maintaining the integrity of the engine compartment.

SUMMARY OF THE INVENTION

It is, therefore, an object of this invention to improve sound suppressing enclosures.

Another object of this invention is to reduce the operational noise level of vehicle engines.

A further object of this invention is to enclose an engine with a sound suppressing enclosure which allows ready access to the interior of the engine compartment as necessary.

Still another object of this invention is to secure the panels forming the engine compartment enclosure in a closed position by a single latch which may be locked to maintain the integrity of the engine compartment.

These and other objects are attained in accordance with the present invention wherein there is provided a sound suppressing engine enclosure including a side panel having an upwardly swingable hood portion, a downwardly swingable service panel and an outwardly swingable sound barrier panel which upon being closed secures the hood and service panels in a closed position such that all panels are secured in a closed position through a single latch lock.

DESCRIPTION OF THE DRAWINGS

Further objects of this invention, together with additional features contributing thereto and advantages accruing therefrom will be apparent from the following description of one embodiment of the invention when read in conjunction with the accompanying drawings:

FIG. 1 is a side profile view of an earthmoving vehicle utilizing the sound suppressing engine enclosure;

FIG. 2 is an enlarged side profile view of the engine enclosure shown in FIG. 1;

FIG. 3 is a cross sectional view of the engine enclosure of FIG. 2 taken along lines 3—3; and FIG. 4 is a cross sectional view of the engine enclosure of FIG. 2 taken along lines 4—4.

DESCRIPTION OF A PREFERRED EMBODIMENT

Referring now to FIG. 1, there is shown an earthmoving vehicle or construction machine 10 referred to in the industry as a front end or wheel loader. The wheel loader 10 includes a loading bucket 11 at the front end of the vehicle, and a rear-mounted engine which supplies power to a loader and bucket as well as functioning as a counterweight during machine operation. The engine (not shown) is enclosed within a compartment or sound suppressing enclosure 100 which suppresses engine noise while permitting adequate air flow to provide engine cooling.

The enclosure 100 is supported on the wheel loader 10 between a radiator shroud 12 and a cover plate 13. The radiator shroud 12, supported from the vehicle by a frame member 16, encloses a portion of a radiator (not shown), to protect the radiator from damage during machine operation and to enclose a radiator fan used to effect air flow through the radiator for engine cooling. The cover plate 13 is carried by the vehicle and secured to the rear of a wheel loader cab 15. The enclosure 100 is preferably constructed as two symmetrical portions with reference to the longitudinal center line of the wheel loader 10. However, the enclosure may be constructed with one end including hinged panels, to be described in detail hereinafter, while the other half is formed as a unitary panel joined to the machine frame 16 and extending upwardly about the engine to a position whereat it joins a hinged hood panel 110. For convenience of illustration, only one half of the enclosure is shown in the drawings and the other half of the enclosure is as described.

Referring to the detailed drawings of FIGS. 2, 3, and 4, the enclosure 100 includes a support panel 101 extending between and supported from the radiator shroud 12 and the cover plate 13. The hood panel 110 is hingedly secured to the support panel 101 about a hinged connection 111 such that the hood panel 110 may swing or pivot upwardly as shown in phantom in FIG. 4. A service panel 120 is hingedly secured to a support 121 carried by the wheel loader frame 16 to allow the service panel to swing or pivot downwardly about the hinged connection 122 as also shown in phantom in FIG. 4.

The hood panel 110 and the service panel 120 (shown closed in FIG. 2) extend toward each other from their respective hinged supports a distance such that their adjacent edges are spaced apart to form an opening in the enclosure between these two edges extending from the radiator shroud 12 to the cover plate 13. This opening allows the radiator fan, which may be either a suction or blower type, to circulate air through the radiator and engine compartment to cool the engine.

One end of the sound suppressing panel 130 is hingedly secured to the wheel loader body about hinged connections 131 such that the panel 130 may swing or pivot outwardly from the hood and service panels 110 and 120, respectively, as shown partially in phantom in FIG. 3. The sound suppressing panel 130 extends a length and a width sufficient to overlap a portion of the hood panel 110, service panel 120 and radiator shroud 12, thereby covering the opening formed by the spaced adjacent edges of these structures. Overlapping of the sound suppressing panel 130 with a portion of the hood and service panels prevents the pivotal movement or opening of the hood and service panels, 110 and 120, from their closed position when the sound suppressing panel 130 is closed against the wheel loader radiator shroud 12. A latch or lock 140 is secured to the radiator shroud so that the sound suppressing panel 130 may be latched or locked in a closed position limiting access to the interior of the enclosure. As best shown in FIGS. 2 and 3, the sound suppressing panel 130 extends outwardly from a plane of the enclosure formed by panels 110, 120 and a portion of the radiator shroud 12. This outward extension creates an opening between the panels 110 and 120 for permitting air to circulate through the radiator and engine compartment as previously described. A series of baffle plates 132 are carried on the inner side of the sound suppressing panel to direct air flow from the engine compartment upwardly when a suction type fan is used for engine cooling thereby diverting the air flow from the wheel loader cab area. In the event a blower fan is used, these baffle plates or air diverters 132 are not necessary. Sound suppressing material 133 is carried by the interior of the sound suppressing panel 130 to suppress the engine noise emitted through the opening formed between the sound suppressing panel 130 and the other panels which are included in the enclosure.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. In an engine enclosure having a top, side shields and opposite ends operatively enclosing an engine, the improvement comprising a first panel hingedly supported from the enclosure top and extending downwardly therefrom to form a portion of the enclosure side, a first hinge means joining said first panel to the enclosure top for pivotal movement relative thereto, a second hingedly supported panel, forming another portion of the enclosure side, extending upwardly toward said first panel with an edge of said second panel spaced from the lowermost edge of said first panel, a second hinge means joining said second panel to the enclosure side for pivotal movement relative thereto, a third hingedly supported panel covering a portion of said first and second panels to close the space therebetween to form the enclosure side, a third hinge means supporting said third panel for pivotal movement from a position out from contact with said first and second panels into a position in overlying contact with at least a portion of said first and second panels, and means for preventing pivotal movement of said third panel when said third panel is in overlying contact with said portions of said first and second panels thereby preventing pivotal movement of said first and second panels.

2. The apparatus of claim 1 wherein said third panel overlies the adjacent edges of said first and second panels.

3. The apparatus of claim 1 wherein said third hingedly supported panel includes sound suppressing material carried adjacent to the space between said first and second panels.

4. The apparatus of claim 1 wherein said first panel is outwardly pivotal, said second panel is outwardly pivotal and said third panel is outwardly pivotal relative to the enclosure side thereby opening the entire side of the enclosure to provide access to the interior thereof.

5. The apparatus of claim 1 wherein said first and second panels lie in a common plane and a portion of said third hingedly supported panel extends outwardly from the plane formed with said first and second panels to form an air flow opening with the interior of the enclosure.

6. The apparatus of claim 5 wherein said third panel further includes air diverter means to deflect air flowing between said panel and the interior of the enclosure.

7. In an engine enclosure having a top, side shields and opposite ends operatively enclosing an engine, the improvement comprising a first pivotal panel joined to the enclosure top by a horizontally extending hinge, said first panel extending downwardly from said hinged connection to form a portion of the enclosure side, a second pivotal panel joined to the enclosure side by a horizontally extending hinge to form another portion of the enclosure side, said second panel extending upwardly toward said first panel with an edge of said second panel opposite to said hinge connection being spaced from the lowermost edge of said first panel, a third pivotal panel joined to the enclosure side by a vertically extending hinge and pivotally movable into overlying contact with at least a portion of said first and second panels to close the space therebetween and to prevent pivotal movement of said first and second panels, and means for releasably securing said third pivotal panel in overlying contact with at least a portion of said first and second panels.

8. The apparatus of claim 7 wherein said third hingedly supported panel includes sound suppressing material carried adjacent to the space between said first and second panels.

9. The apparatus of claim 7 wherein said first and second panels lie in a common plane and a portion of said third hingedly supported panel extends outwardly from the plane formed with said first and second panels to form an air flow opening with the interior of the enclosure.

10. The apparatus of claim 9 wherein said third panel further includes air diverter means to deflect air flowing between said panel and the interior of the enclosure.

* * * * *